United States Patent [19]
Stevens

[11] 3,803,488

[45] Apr. 9, 1974

[54] NON-INTEGRAL HAZARDOUS ELECTRICAL POTENTIAL INDICATING DEVICE

[75] Inventor: William L. Stevens, Buchanan, Mich.

[73] Assignee: The Raymond Lee Organization, Inc., New York, N.Y.

[22] Filed: Dec. 6, 1972

[21] Appl. No.: 312,673

[52] U.S. Cl............. 324/133, 324/72.5, 339/113 L
[51] Int. Cl....................... G01r 19/16, G01r 31/02
[58] Field of Search ............ 324/51, 72.5, 133, 122; 339/113 L, 31 T, 108 TP, 151 B; 340/252

[56] References Cited
UNITED STATES PATENTS

| | | | |
|---|---|---|---|
| 2,474,407 | 6/1949 | Todd et al. ....................... | 324/133 |
| 2,611,008 | 9/1952 | Wilcock et al..................... | 324/51 |
| 2,474,073 | 6/1949 | Sundt............................ | 324/122 XR |
| 2,610,237 | 9/1952 | Benner......................... | 324/133 XR |

Primary Examiner—Gerard R. Strecker

[57] ABSTRACT

A polarity detector comprising: a transparent electrically nonconductive elongated body having a recess in one end; first electrically conductive means secured to the outside of the body intermediate the ends; and a neon lamp disposed in said body adjacent the other end, said lamp having a first terminal electrically connected to the first means and a second terminal electrically connected to the second means.

1 Claim, 4 Drawing Figures

PATENTED APR 9 1974  3,803,488

NON-INTEGRAL HAZARDOUS ELECTRICAL POTENTIAL INDICATING DEVICE

FIELD OF THE INVENTION

All electrical and electronic apparatus using electrically conductive chassis upon or within which electrical or electronic components are mounted receive electric power in such manner that the chassis is either maintained at ground (or zero reference) potential or is maintained at a potential differing from ground by being appreciably above or below ground potential. As a result, unless great care is taken, one chassis may be at ground while an adjacent chassis is 'hot', that is is at a potential differing from ground. When all chassis are supplied from the same source, reversing one or another plug connection between chassis and source can enable all chassis to be grounded.

The significance of having different chassis at different potentials is that an individual touching such different chassis will have the difference of potential or voltage drop applied across a portion of his or her body and can receive a nasty shock. At best the shock is painful and disrupting. At worst, the shock can kill.

SUMMARY

I have devised a polarity detector which enables a user to discover whether or not a chassis is at ground potential without risk or shock. The detector contains a neon lamp. One terminal of the lamp is permanently or temporarily connected to the chassis. The other terminal is connected to means detachably engagable by the user. The user is in contact with a point of ground or zero potential. If the chassis is also at this potential, when the user touches the means, both lamp terminals are at the same potential and the lamp is dark. If the chassis is at different potential, when the user touches the lamp means, a difference of potential between the lamp terminal, and the lamp flows. The glow is a signal telling the user to reverse plug connections or the like to bring the chassis to ground. A neon lamp is used because it will glow at low values of potential differences. Conventional incandescent lamps require such larger differences for operation.

DETAILED DESCRIPTION OF PREFERRED EMBODIMENT

Figure 1:
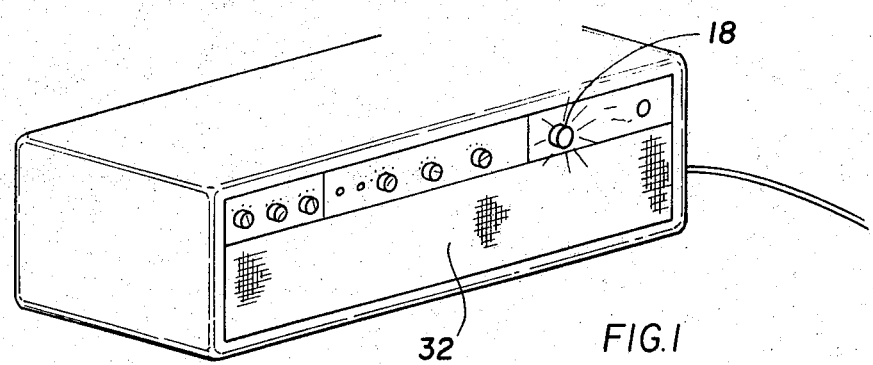
FIG. 1 is a perspective showing my invention ready for use.
Figure 2:
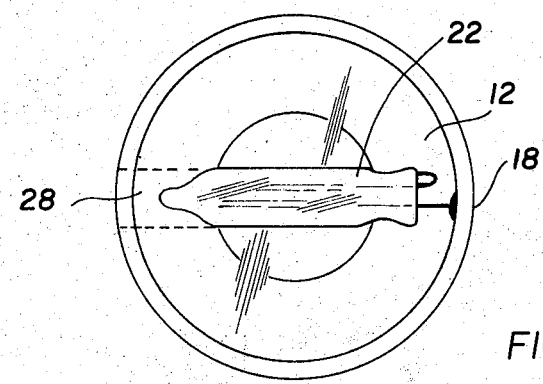
FIG. 2 is a plan of my invention.
Figure 3:
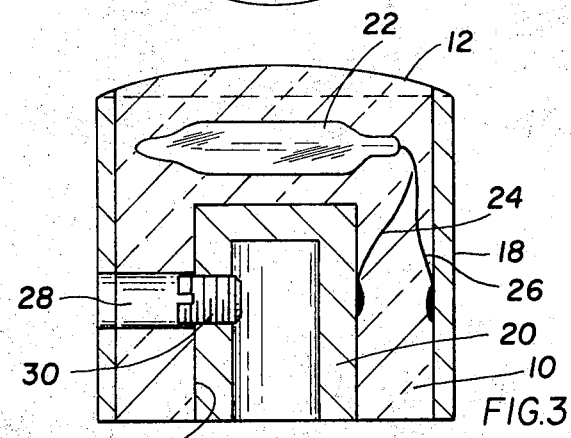
FIG. 3 is a vertical cross section thereof and
FIG. 4 is a bottom plan thereof.
Figure 4:
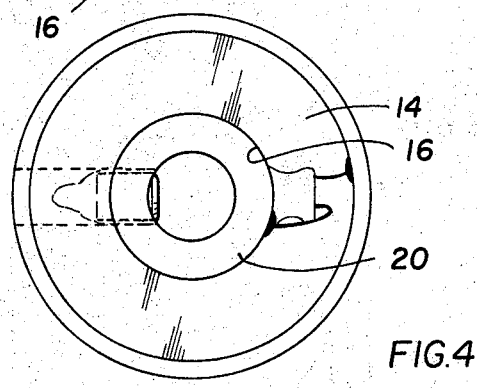

An electrically nonconductive transparent plastic cylinder 10 has a slightly rounded lens type top end 12 and a flat bottom end 14 having a central axial recess 16.

An electrically conductive hollow metal sleeve 18 surrounds the cylinder intermediate its ends. A second like conductive sleeve 20 is disposed in the recess with bottom end closed and top end open and flush with end 14.

A neon lamp 22 is buried transversely in the cylinder adjacent end 12 with one terminal connected via lead 24 to sleeve 20 and the other terminal connected via lead 26 to sleeve 18.

A transverse bore 28 passes through sleeve wall of sleeve 18, a portion of cylinder 10 and the sleeve wall of sleeve 20. A set screw 30 is disposed in the bore in the wall of sleeve 20.

In use a metal shaft connected to a chassis 32 is exposed and sleeve 20 is secured thereto with screw 30 set to hold the structure in place. One terminal of the lamp is thus connected to the chassis. The user touches sleeve 18 to place the invention in use as previously described. Sleeve 20 could be shaped into a probe and the device can then be used to test a number of chassis in sequence.

While I have described my invention with particular reference to the drawings, such is not to be considered as limiting its actual scope.

I claim:

1. Non-integral hazardous electrical potential indicating device comprising:
   a transparent electrically nonconductive elongated body having a recess in one end;
   an electrically conductive hollow metal sleeve having one open end flush with the said one end of the body and an opposite closed end disposed in the recess;
   a second electrically conductive hollow metal sleeve in which said body is disposed and secured to the outside of said body intermediate the ends; and
   a neon lamp disposed in said body adjacent the other end, said lamp having a first terminal electrically connected to the first sleeve and a second terminal electrically connected to the second sleeve;
   wherein a bore extends transversely through the wall of the second sleeve, said body and the wall of the first sleeve, said bore containing a set screw spaced from the second sleeve and disposed in the first sleeve, and wherein the first sleeve is a probe.

* * * * *